United States Patent
Garg et al.

(10) Patent No.: US 11,316,706 B2
(45) Date of Patent: Apr. 26, 2022

(54) METHOD AND SYSTEM FOR USING DYNAMIC PRIVATE KEYS TO SECURE DATA FILE RETRIEVAL

(71) Applicant: MASTERCARD INTERNATIONAL INCORPORATED, Purchase, NY (US)

(72) Inventors: Chandan Garg, Punjab (IN); Ankur Arora, New Delhi (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 354 days.

(21) Appl. No.: 16/385,498

(22) Filed: Apr. 16, 2019

(65) Prior Publication Data

US 2020/0336318 A1    Oct. 22, 2020

(51) Int. Cl.
*H04L 9/32* (2006.01)
*H04L 9/06* (2006.01)
*H04L 9/08* (2006.01)
*G06F 21/62* (2013.01)

(52) U.S. Cl.
CPC ........ *H04L 9/3297* (2013.01); *G06F 21/6209* (2013.01); *H04L 9/0637* (2013.01); *H04L 9/0825* (2013.01)

(58) Field of Classification Search
CPC ... H04L 9/3297; H04L 9/0825; H04L 9/0637; H04L 9/3247; H04L 9/3239; H04L 2209/38; G06F 21/6209
See application file for complete search history.

(56) References Cited

U.S. PATENT DOCUMENTS

| | | | | |
|---|---|---|---|---|
| 9,680,872 | B1 * | 6/2017 | Roth | G06F 21/57 |
| 10,108,954 | B2 * | 10/2018 | Dunlevy | G06Q 20/36 |
| 2009/0240907 | A1 * | 9/2009 | Crandell | G06F 21/78 |
| | | | | 711/163 |
| 2010/0138652 | A1 * | 6/2010 | Sela | H04L 9/3268 |
| | | | | 713/158 |
| 2011/0055585 | A1 * | 3/2011 | Lee | H04L 9/0844 |
| | | | | 713/183 |
| 2019/0012480 | A1 * | 1/2019 | Thorwirth | G06Q 30/02 |
| 2020/0228342 | A1 * | 7/2020 | Nixon | H04L 9/3236 |

* cited by examiner

*Primary Examiner* — Fatoumata Traore
*Assistant Examiner* — Hamid Talaminaei
(74) *Attorney, Agent, or Firm* — Buchanan Ingersoll & Rooney PC (57) ABSTRACT

A method for validating access to data files using a combination of secure data values includes: storing at least a first check value and a seed value in an account profile; receiving a data request message including at least a first data value, a second data value, a timestamp, and a data file request from a computing device; identifying a second check value using a predetermined algorithm applied to at least the seed value and the timestamp; validating the first data value using the first check value and the second data value using the second check value; and transmitting one or more data files indicated in the data file request to the computing device upon successful validation of the first data value and the second data value.

14 Claims, 5 Drawing Sheets

METHOD AND SYSTEM FOR USING DYNAMIC PRIVATE KEYS TO SECURE DATA FILE RETRIEVAL

FIELD

The present disclosure relates to the securing of data files using dynamic private keys, specifically the use of multiple source data values, including a private key and a known seed value and timestamp combination, to authenticate a data request before providing data files to a user.

BACKGROUND

As part of the operation of many businesses, a business must often make data files available to its employees. In many cases, complicated databases and other types of data storage are used to ensure that a vast number of employees have access to the business's data files, and to prevent conflicts and other issues that may arise in such a busy system. One method that is often used to assist in the control of and logging of access to data files is the use of a form of authentication prior to data retrieval. The user is authenticated by the system to ensure that the user has permission to access the requested data files, where the user's permissions can be restricted if the user's employment were to be terminated.

In some cases, access to data files may not be specific to an individual user, but may instead be specific to a specific data value, such as a private key, digital signature, or device identifier. For example, a business may use a distributed data storage, such as a blockchain, where the use of digital signatures is a native part of the system, such that employees may be provided private keys that are usable to access data files stored therein. In such cases, the use of a static data value may pose a potential threat to a business. For instance, should the static data value be copied or a computing device that stores the static data value be stolen, the data files accessible by that data value could be compromised. In some cases, it may be difficult or impossible to (i) easily identify if the static data value has been compromised, and (ii) prevent use of the static data value in accessing data files in the system. For instance, in a blockchain, nodes are typically configured to simply perform mathematical operations to verify if a digital signature generated by a private key is valid, without being configured to perform any checks regarding the validity of the underlying key. Likewise, if an unauthorized copy of a private key were to be made, the copy may not be detected until unauthorized data access has already occurred.

Thus, there is a need for a system where access to data files is prevented through the use of a dynamic data value rather than a static data value, such that unauthorized copies of a used data value may have little value in future access to data files, and where future use of a data value can be easily prohibited by the system.

SUMMARY

The present disclosure provides a description of systems and methods for validating access to data files using a combination of secure data values. Each time access to data files is requested, a first check value and a seed value may be used to verify approval for access to the data files. The seed value may be used with a timestamp provided in the data request to generate a second check value that is to be used using a known algorithm that is agreed upon by the system performing the verification and the device used to request access to the data files. In some cases, the data request may include the first check value and second check value separately, where each may be verified by the system. In other cases, the first check value and second check value may be combined in an agreed-upon manner. As a result, the device requesting the data files must know and/or be able to generate both check values for access to be provided. The use of a seed and timestamp makes at least the second check value dynamic, such that if the first check value is compromised, an entity in possession thereof would still be denied access to the data files without knowledge of the seed as well as the method used to generate the second check value based thereon. In addition, because the check values can be user-agnostic, users need not retain any information or be given separate access beyond being supplied with a device suitable to generate the first and second check values. Similarly, modification to the local seed in the system may prevent any access to the data files by a supplied device, as validation would always fail, thus making it simple for the system to control access to data files, such as in instances where a device may be compromised. As a result, the methods and systems discussed herein solve the technical problems facing many data access schemes in a manner that is convenient and easy to use for both users and administrators.

A method for validating access to data files using a combination of secure data values includes: storing, in an account profile in an account database of a processing server, at least a first check value and a seed value; receiving, by a receiver of the processing server, a data request message including at least a first data value, a second data value, a timestamp, and a data file request from a computing device; identifying, by a processing device of the processing server, a second check value using a predetermined algorithm applied to at least the seed value and the timestamp; validating, by the processing device of the processing server, the first data value using the first check value and the second data value using the second check value; and transmitting, by a transmitter of the processing server, one or more data files indicated in the data file request to the computing device upon successful validation of the first data value and the second data value.

A system for validating access to data files using a combination of secure data values includes: an account profile in an account database of a processing server configured to store at least a first check value and a seed value; a receiver of the processing server configured to receive a data request message including at least a first data value, a second data value, a timestamp, and a data file request from a computing device; a processing device of the processing server configured to identify a second check value using a predetermined algorithm applied to at least the seed value and the timestamp, and validate the first data value using the first check value and the second data value using the second check value; and a transmitter of the processing server configured to transmit one or more data files indicated in the data file request to the computing device upon successful validation of the first data value and the second data value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Validating Access to Data Files

Figure 1:
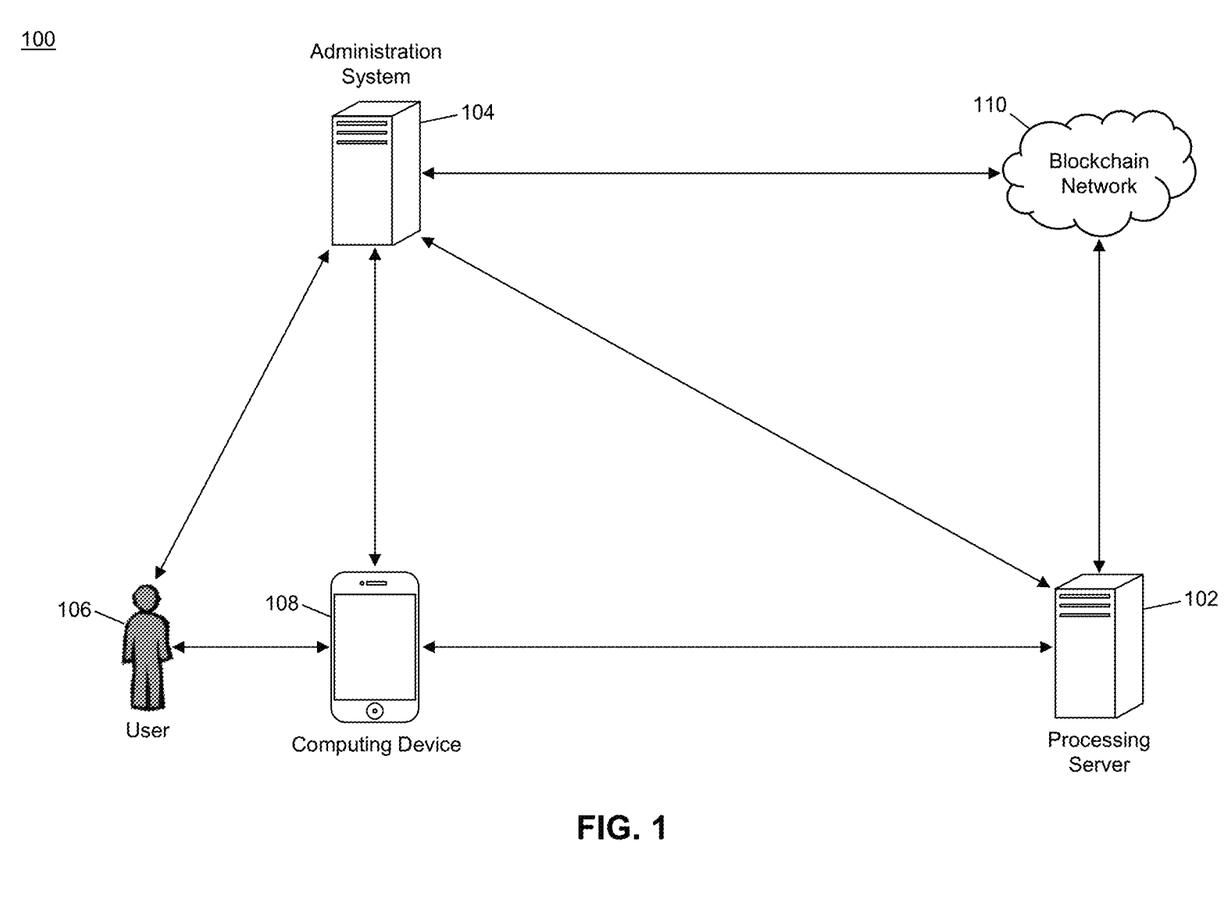
FIG. 1 is a block diagram illustrating a high level system architecture for validating access to data files using a combination of secure values accordance with exemplary embodiments.

FIG. 1 illustrates a system 100 for the validation of access to data files using a combination of secure data values including a combination of a known seed value and a timestamp for at least one of the secure data values.

The system 100 may include a processing server 102. The processing server 102, discussed in more detail below, may be configured to control access to data files by users 106 in the system 100 using a combination of secure values and checks thereon. In the system 100, an administration system 104 may manage a plurality of users 106 that may have a need for accessing data files. For instance, the administration system 104 may be part of a business where each user 106 is an employee that may have a need to access data files as part of their regular employment duties. In another example, the administration system 104 may be a computing device in a home network where a parent may want to control access to data files by children as the users 106, such as to prevent or control access to sensitive information. As discussed herein, the processing server 102 may be part of the administration system 104 or may be a separate device and/or system that is used for validating access to data files.

In the system 100, a user 106 may possess or otherwise have access to a computing device 108. The computing device 108 may be configured to generate or otherwise identify secure data values that are to be presented to the processing server 102 in order to access data files. The computing device 108 may be any type of device suitable for performing the functions discussed herein, such as a desktop computer, laptop computer, notebook computer, tablet computer, cellular phone, smart phone, smart watch, smart television, wearable computing device, implantable computing device, etc. In some cases, a combination of devices may be used as the computing device 108. For instance, the user 106 may use a desktop computer to request one or more data files from the processing server 102, but may use a separate dongle, fob, radio frequency identification tag, near field communication tag, or other separate device to generate or otherwise identify the secure data values that are provided to the processing server 102 for validation. As discussed herein, "computing device" may thus refer to a single device or any combination of devices that are used to request access to data files from the processing server 102 and receive data files therefrom.

In the system 100, a computing device 108 may be provided with a first data value and a seed value. The seed value may be a random or pseudo-random seed that is generated and provided to the computing device 108 as part of validating access to data files. In some cases, the first data value and seed value may be provided to the computing device 108 by the administration system 104. In such cases, the administration system 104 may also provide these values to the processing server 102. In other cases, the processing server 102 may generate these values and provide them to the administration system 104.

The first data value may be used as a first check value or used to generate a first check value that is checked by the processing server 102 as part of the validation of access to data files. For instance, in one example the first data value may be a random or pseudo-random value that is provided to the computing device 108, that is provided directly to the processing server 102 when requesting access to data files. In another example, the first data value may be a private key. In such an example, the computing device 108 may provide the private key directly to the processing server 102 as part of the validation. In another such example, the computing device 108 may generate a digital signature with the private key that may be validated by the processing server 102 using a public key corresponding to the private key in a cryptographic key pair comprising the public and private keys. In some such embodiments, the private key may be generated by the administration system 104 and/or processing server 102 and distributed to the computing device 108 with the seed value. In other such embodiments, the computing device 108 may generate the private key and provide the corresponding public key (e.g., or the private key itself, as applicable) to the processing server 102 as part of the setup process.

The computing device 108 and the processing server 102 may thus both be in possession of the first data value (e.g., or a data value associated therewith by the processing server 102, such as a public key in such implementations) and the seed value. The computing device 108 and processing server 102 may both agree upon, such as during the setup process, an algorithm for use in generating a second data value. The second data value may be generated using a combination of at least the seed value and a timestamp, where any algorithm, mathematical operation, or other type of operation may be used. In some cases, additional values, such as a salt, may be used in generating the second data value. In such cases, the additional values may also be exchanged between the computing device 108 and the processing server 102 and/or administration system 104 during the setup process.

When the user 106 wants to request access to data files, the computing device 108 may take a timestamp and generate the second data value using the timestamp and the seed value. The computing device 108 may then submit a data request message to the processing server 102 using any suitable communication network and method. The data request message may include an indication of one or more data files being requested (e.g., file names, data paths, executable queries, or any other data that may be used by a computing system to identify data files), the timestamp, and the first and second data values or a combination thereof. In some cases, the first data value included in the data request message may be generated by the computing device 108 as part of the creation of the data request message, such as in cases where the first data value is a digital signature generated using a private key.

The processing server 102 may receive the data request message from the computing device 108 and attempt to validate the first and second data values included therein. The computing device 108 may identify the seed value corresponding to the computing device 108. In cases where the first data value was provided directly to the processing server 102 (e.g., a private key or other similar value), the processing server 102 may directly identify the first data value stored in a memory therein and the associated seed value. In other cases, the data request message may further include an identifier or other value that may be used to identify the seed value and other data to be used by the processing server 102 (e.g., a public key) to validate the access of the computing device 108. In such cases, an identifier may be exchanged between the processing server 102 and the computing device 108 as part of the setup process.

Once the seed value has been identified, the processing server 102 may generate a second check value using the seed value and the timestamp found in the data request message using the agreed-upon method. The processing server 102 may then check the second check value against the second data value found in the data request message to see if the two values match. If the values do not match, then the access to the requested data files may be prohibited. The processing server 102 may also perform a check of the first data value to the first check value identified by the processing server 102. In cases where the first data value is a private key, the processing server 102 may check to see if the private key matches the private key stored in the profile associated with the computing device 108. In cases where the first data value is a digital signature, the processing server 102 may validate the digital signature using a public key stored in the profile associated with the computing device 108 using a suitable signature generation algorithm. If the check of the first data value fails, then the access to the requested data files may be prohibited.

In instances where the first data value and second data value are combined, the processing server 102 may combine the first check value and the second check value using the agreed-upon method. For instance, the computing device 108 may concatenate the first data value and the second data value into a single value that is included in the data request message. The processing server 102 may generate or otherwise identify the first check value and second check value, and then concatenate the values into a single check value, which may be checked directly to the single value to determine if the two values match. In such an instance, if the values do not match, the access to the requested data files may be prohibited.

In instances when the access to the requested data files is prohibited, the processing server 102 may return a data message to the computing device 108 indicating that the access is denied. In some cases, the data message may provide a reason for the denial of access, such as indicating that authentication failed. In some cases, the reason may indicate which check failed (e.g., the first data value or the second data value).

If the validations of the first data value and second data value by the processing server 102 are both successful, then the processing server 102 may identify the data files that were indicated in the data request message. The identified data files may then be provided to the computing device 108 using any suitable communication network and method. In some cases, the validation may be used to unlock access to a database or other location of data files, where the computing device 108 may then freely request data files as necessary. For instance, the process discussed above may be used as an authentication process when connecting to a database, where the user 106 can access the data files in the database at will. In such instances, the data request message may not include any data file indications, or may include an indication that open access to the data files is requested. In some cases, the processing server 102 may validate permissions of the computing device 108 (e.g., as stored in the profile associated therewith that includes the seed value) to access the requested data files in addition to validating the first and second data values. For example, the computing device 108 may be validating as having access to data files in general, but may limited in which specific data files may be accessed, where such additional validation may be performed by the processing server 102 using suitable methods.

In some embodiments, the data files being requested by the user 106 may be stored in a distributed data storage, such as a blockchain. In such embodiments, the system 100 may include a blockchain network 110. The blockchain network 110 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 and/or administration system 104 may be a node in the blockchain network 110. In some cases, the blockchain network 110 may be comprised of only a single node that uses a blockchain for data storage, such as the processing server 102 or administration system 104 as the single node.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may include a data file or data used to access a stored data file, such as a file path. In such embodiments, the data request message may indicate a blockchain data value, such as using an identifier or other information that may be included in or accompanying the blockchain data value in the blockchain. For example, a unique value may be included in each blockchain data value, which may be used as a file path when requesting the data file included in the respective blockchain data value. In another example, each data file stored in the blockchain may have a unique name or other type of identification value that may be used in the data request message. In some cases, a blockchain data value may include multiple data files. In some instances, a blockchain data value may include permission data regarding permissions of users 106 and/or computing devices 108 in accessing the data files included therein.

In some embodiments, computing devices 108 may be eligible to add new data files (e.g., files that are wholly new to the blockchain or modified versions of existing data files) to the blockchain. In such embodiments, the above process may be used where the new data files may be included in the data request message in place of the indication of data files being requested, where the processing server 102 may similar validate access of the computing device 108 to store the new data files in the blockchain. In some embodiments, computing devices 108 may be required to provide digital signatures, which may be separate from digital signatures used in validation of data access, for attribution of new data files that are being stored in the blockchain. In such embodiments, each computing device 108 may have a blockchain wallet included therein.

A blockchain wallet may include a private key of a cryptographic key pair that is used to generate digital signatures that serve as authorization by the user 106 and/or computing device 108 for a blockchain transaction, where the digital signature can be verified by the blockchain network 110 using the public key of the cryptographic key pair. In some cases, the term "blockchain wallet" may refer specifically to the private key. In other cases, the term "blockchain wallet" may refer to the computing device that stores the private key for use thereof in blockchain transactions. In these embodiments, the digital signature may be validate by the node in the blockchain network 110 using the corresponding public key, where the digital signature and/or public key, or other data identifying the computing device 108 and/or blockchain wallet that submitted the data files, may be included in the blockchain data value that includes the new data values. In such instances, the blockchain may thus provide a record of the originator of each data file stored therein.

In some embodiments, a blockchain may be used to store the profiles of computing devices 108. For instance, each blockchain data value may include the public key or other first check value and the corresponding seed value, which may be used in validation of received data request messages. In some such embodiments, a blockchain used to store the profiles may be separate from a blockchain used to store data files, profiles may be stored in a blockchain while data files may use a separate type of data storage, or a single blockchain may be used to store profiles and data files.

A user 106 may thus be able to freely access data files (e.g., as permitted by any additional permission restrictions) by using the computing device 108, which may supply the first and second data values (e.g., or a combination thereof) as needed. If a different user is in need of accessing data files, the user 106 can provide the computing device 108 or access thereto to the different user. For example, in embodiments where a separate dongle or fob is used, the user 106 can provide the fob to the different user, which may communicate with the processing server 102 and provide access to data files to a computing device 108 being used by the different user.

When the administration system 104 wants to remove access to data files for a computing device 108, such as in cases where a computing device 108, fob, dongle, or other device is stolen or otherwise compromised, the administration system 104 can simply have the processing server 102 modify or change the seed value included in the profile associated with the device. Modification or replacement of the seed value may result in any validation of the second data value submitted in a data request message by that device failing, as the device will no longer have the correct seed value. Thus, loss or theft of a computing device 108 is mitigated in the system 100. Likewise, if a data request message is intercepted, the intercepting party may be unable to access any additional data files as the second data value is dynamic and will be different in every single data request message due to use of the seed value and timestamp. In some cases, the processing server 102 may also validate the timestamp, such as by only allowing access to data files with timestamps that are within a predetermined period of time of receipt of the data request message, such to prevent later use of an intercepted data request message. Thus, risk due to interception of a data request message may also be mitigated in the system 100. Accordingly, the methods and systems discussed herein provide for controlled access to data files that has a significantly risk of loss or compromise of data due to lost or stolen devices and intercepted data requests than traditional methods and systems due to the use of multiple data values as well as at least one of the data values being dynamic due to use of the seed value and timestamp combination.

Processing Server

Figure 2:
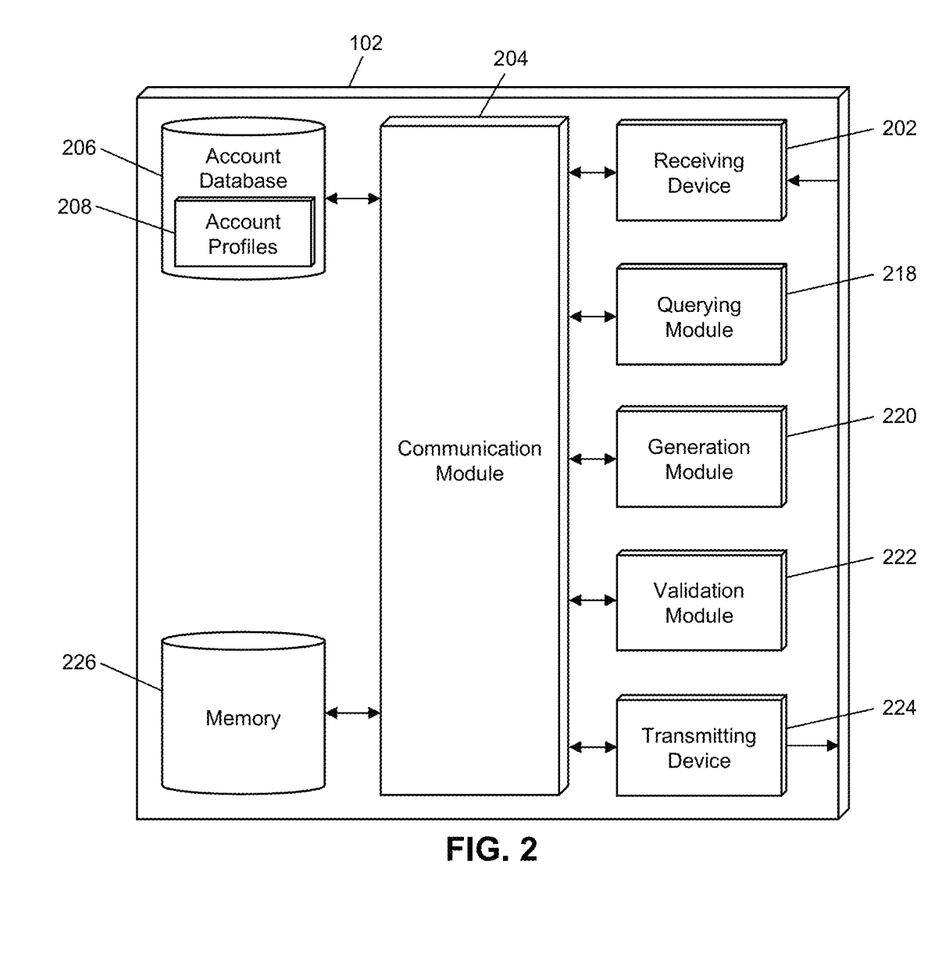
FIG. 2 is a block diagram illustrating the processing server of the system of FIG. 1 for validating access to data files using a combination of secure values in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from administration systems 104, computing devices 108, blockchain networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by administration systems 104 that are superimposed or otherwise encoded with seed values and first data values, which may include private keys, public keys, or other values, and may be accompanied by a unique identifier and/or an algorithm for use in generating a second check value. The receiving device 202 may also be configured to receive data signals electronically transmitted by computing devices 108 that are superimposed or otherwise encoded with data request messages and new data file submissions, which may include first and second data values, a timestamp, account identifiers (e.g., as applicable), and indications of data files being requested or new data files being submitted. In some embodiments, the receiving device 202 may be configured to receive data signals electronically transmitted by nodes in a blockchain network 110, which may be superimposed or otherwise encoded with blockchain data values or data included therein, such as data files or file paths for use in locating data files.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a computing device 108 that is authorized to access data files in the system 100. An account profile 208 may include at least a first check value and a seed value. The first check value may be, for instance, a private key or a public key. In some embodiments, an account profile 208 may also include an account identifier or permission data regarding permissions to specific data files or storage areas for data files.

The processing server 102 may include a querying module 218. The querying module 218 may be configured to execute queries on databases to identify information. The querying module 218 may receive one or more data values or query strings, and may execute a query string based thereon on an indicated database, such as the account database 206 of the processing server 102 to identify information stored therein. The querying module 218 may then output the identified information to an appropriate engine or module of the processing server 102 as necessary. The querying module 218 may, for example, execute a query on the account database 206 to identify an account profile 208 related to a received data request message based on the first data value or an account identifier included therein.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102.

For example, the generation module 220 may be configured to generate second check values using seed values and timestamps.

The processing server 102 may also include a validation module 222. The validation module 222 may be configured to perform validations and verifications for the processing server 102 as part of the functions discussed herein. The validation module 222 may receive instructions as input, which may include data to be validated and/or data to be used in the validation. The validation module 222 may perform a validation or verification as requested, and may output a result of the validation to another module or engine of the processing server 102. The validation module 222 may, for example, validate a digital signature included in a data request message using a public key included in an identified account profile 208.

The processing server 102 may also include a transmitting device 224. The transmitting device 224 may be configured to transmit data over one or more networks via one or more network protocols. In some instances, the transmitting device 224 may be configured to transmit data to administration systems 104, computing devices 108, blockchain networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to administration systems 104 that are superimposed or otherwise encoded with requests for device data, updates to seed values or other data, request for or updates to permission data, etc. The transmitting device 224 may also be configured to electronically transmit data signals to computing devices 108, which may be superimposed or otherwise encoded with requested data files, notifications regarding failed validations, notifications regarded submitted new data files, etc. The transmitting device 224 may also be configured to electronically transmit data signals to nodes in the blockchain network 110 that may be superimposed or otherwise encoded with new data files for addition to the blockchain, requests for blockchain data values or data included therein, requests for account profile data, etc.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices 108, communication data for administration systems 104, data files, file paths for data files, signature generation algorithms, algorithms for generation of second check values, etc.

Process for Validation of Data File Access

Figure 3:
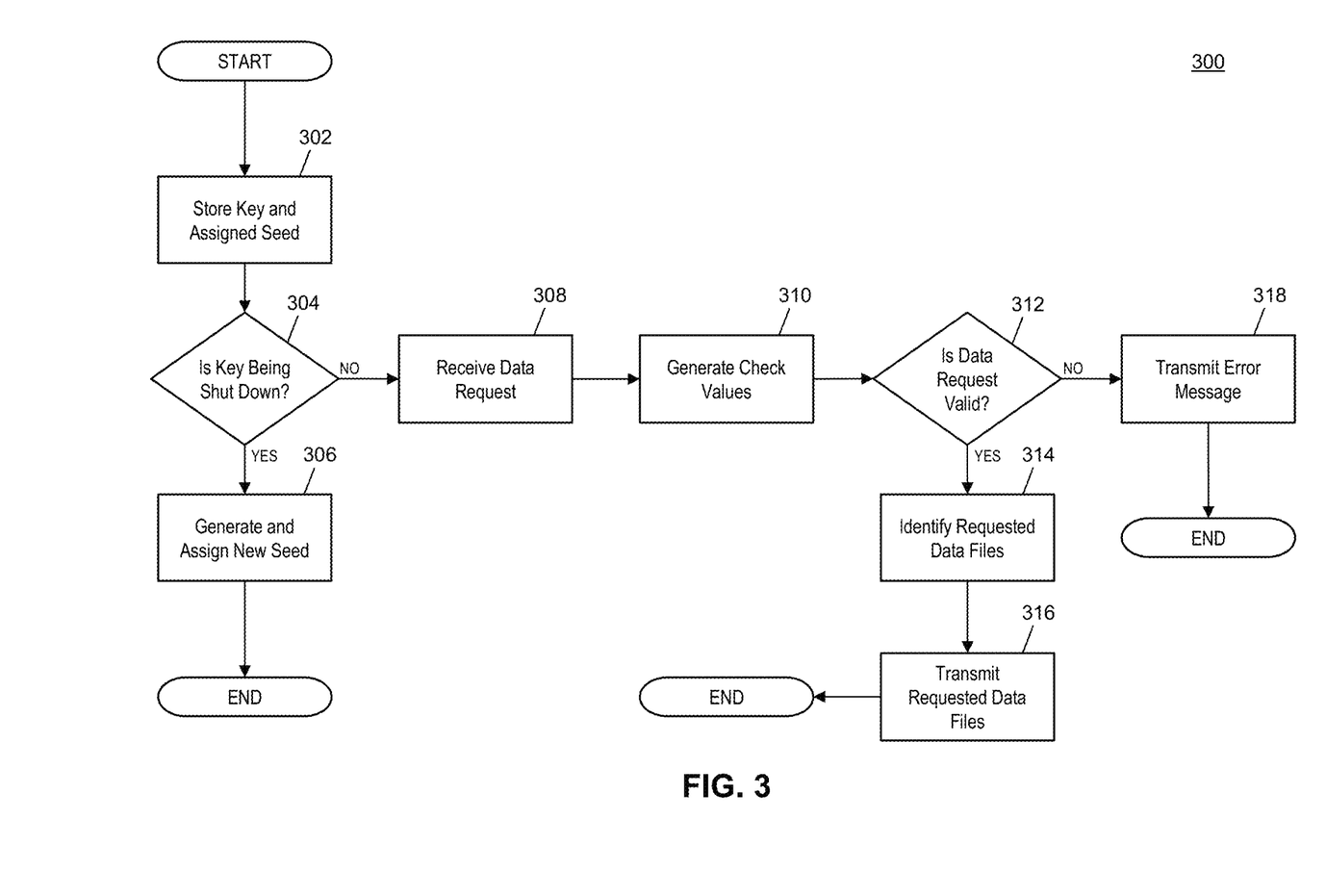
FIG. 3 is a flow diagram illustrating a process for validating access to data files as executed by the processing server of FIG. 2 for use in the system of FIG. 1 in accordance with exemplary embodiments.

FIG. 3 illustrates an example process 300 executed by the processing server 102 of FIG. 2 for use in the system 100 of FIG. 1 for validating requests for access to data files as submitted by a user 106 using a computing device 108.

In step 302, the querying module 218 of the processing server 102 may execute a query on the account database 206 of the processing server 102 to insert a new account profile 208 therein that includes a private or public key and the corresponding seed value that was provided to a computing device 108 for access to data files. In step 304, the processing server 102 may determine if a key (e.g., a computing device 108 associated with a key in the account profile 208) needs to be shut down, such as due to loss or theft of the computing device 108 or compromise thereof. Such a determination may be based on, for instance, receipt of a notification from the administration system 104 or the computing device 108 itself. If the key is being shut down, then, in step 306, the generation module 220 of the processing server 102 may generate a new seed value and the querying module 218 of the processing server 102 may execute a query on the account database 206 to replace the seed value in the account profile 208 with the new seed value.

If the key is not being shut down, then, in step 308, the receiving device 202 of the processing server 102 may receive a data request message from a computing device 108. The data request message may include at least a first data value, a second data value (e.g., or a combination of both data values), a timestamp, and an indication of one or more data files being requested. In step 310, the processing server 102 may have the querying module 218 execute a query on the account database 206 to identify the first data value and seed value included in the account profile 208 related to the computing device 108, and have the generation module 220 generate a second check value using the seed value identified in the account profile 208 and the timestamp included in the data request message.

In step 312, the validation module 222 of the processing server 102 may attempt to validate the first data value and the second data value in the data request message using the first check value included in the identified account profile 208 and the second check value generated by the generation module 220. If both data values are validated successfully (e.g., the private key as the first data value matches the private key stored in the account profile or the digital signature as the first data value is validated using the public key stored in the account profile, and the second check value matches the second data value), then, in step 314, the processing server 102 may identify the requested data files, such as by executing a query on the memory 226 or transmitting a data request to a node in the blockchain network 110. In step 316, the transmitting device 224 of the processing server 102 may transmit the identified data files to the computing device 108. If, in step 312, the validation of the first and second data values by the validation module 222 fails, then, in step 318, the transmitting device 224 of the processing server 102 may transmit an error message to the computing device 108 indicating that the validation failed. In some cases, the process 300 may return to step 308 where the computing device 108 may submit a new data request message for another attempt at successful validation.

Exemplary Method for Validating Access to Data Files

Figure 4:
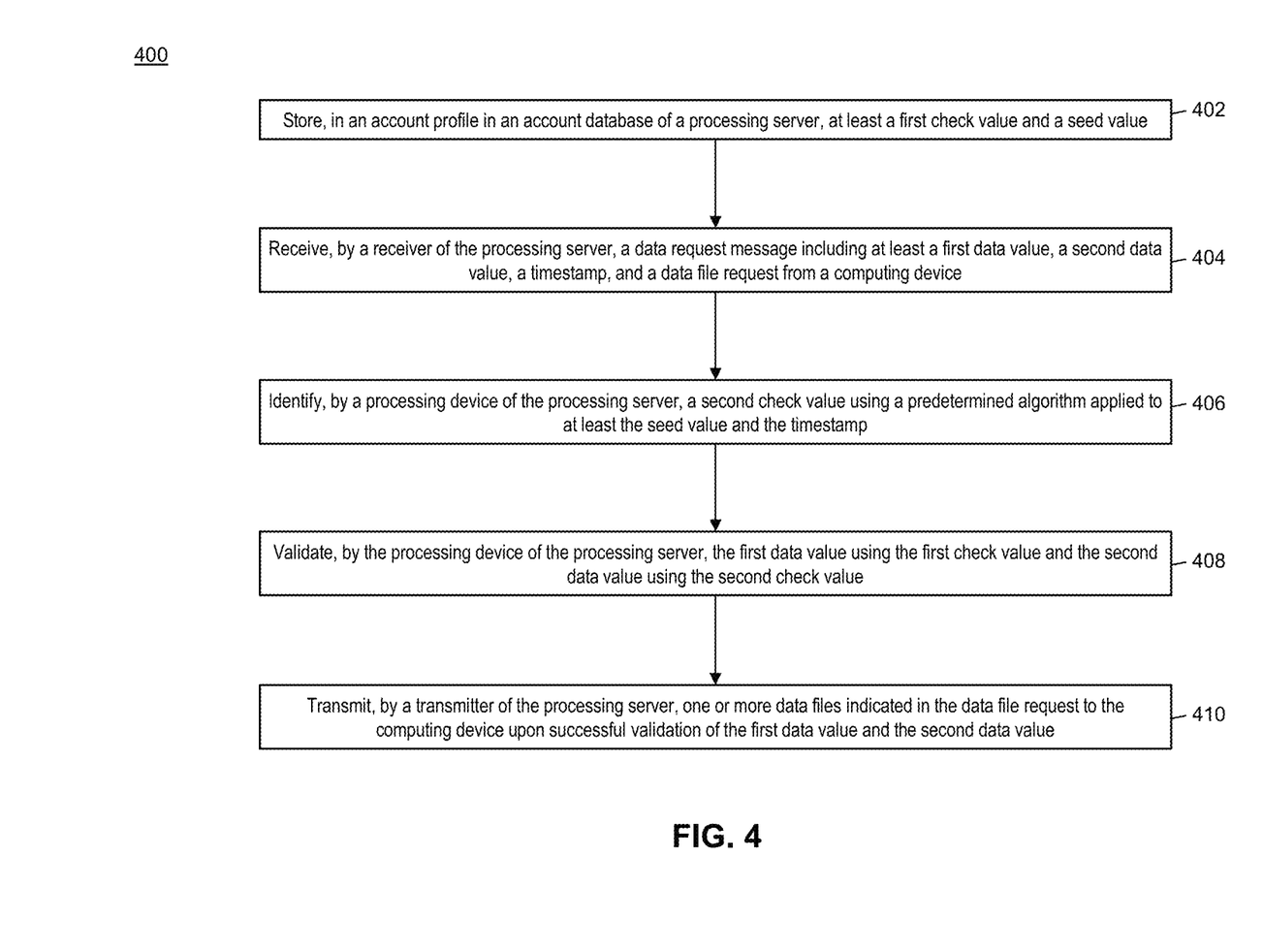
FIG. 4 is a flow chart illustrating an exemplary method for validating access to data files using a combination of secure data values in accordance with exemplary embodiments.

FIG. 4 illustrates a method 400 for validating access to data files by a computing device by using a combination of secure data values including a seed value and timestamp used to generate one of the secure data values.

In step 402, at least a first check value and a seed value may be stored in an account profile (e.g., an account profile 208) in an account database (e.g., the account database 206) of a processing server (e.g., the processing server 102). In step 404, a data request message including at least a first data value, a second data value, a timestamp, and a data file request may be received by a receiver (e.g., the receiving device 202) of the processing server from a computing device (e.g., the computing device 108). In step 406, a second check value may be identified by a processing device (e.g., the generation module 220) of the processing server using a predetermined algorithm applied to at least the seed value and the timestamp.

In step 408, the first data value may be validated by the processing device (e.g., the validation module 222) using the first check value and the second data value may be validated using the second check value. In step 410, one or more data files indicated in the data file request may be transmitted by a transmitter (e.g., the transmitting device 224) of the processing server to the computing device upon successful validation of the first data value and the second data value.

In one embodiment, identifying the second check value may include receiving output from a smart contract stored in a blockchain that is configured to execute upon input of the timestamp. In a further embodiment, identifying the second check value may further include submitting, by the processing device of the processing server, the timestamp to the smart contract. In some embodiments, the first check value may be a private key of a cryptographic key pair, the first data value may be the private key, and validating the first data value using the first check value may include confirming a match between the first data value and the first check value.

In one embodiment, the first check value may be a public key of a cryptographic key pair, the first data value may be a digital signature generated using a private key of the cryptographic key pair, and validating the first data value using the first check value may include validating the digital signature using the public key and a suitable signature generation algorithm. In some embodiments, the one or more data files may be stored in a blockchain. In a further embodiment, the processing server may be a node in a blockchain network (e.g., the blockchain network 110) that administers the blockchain. In one embodiment, the first data value and the second data value may be included in the data request message as a concatenated data string, and validating the first data value and the second data value may include generating, by the processing device of the processing server, a check data string by concatenating the first check value and the second check value and confirming a match between the concatenated data string and the check data string.

Computer System Architecture

Figure 5:
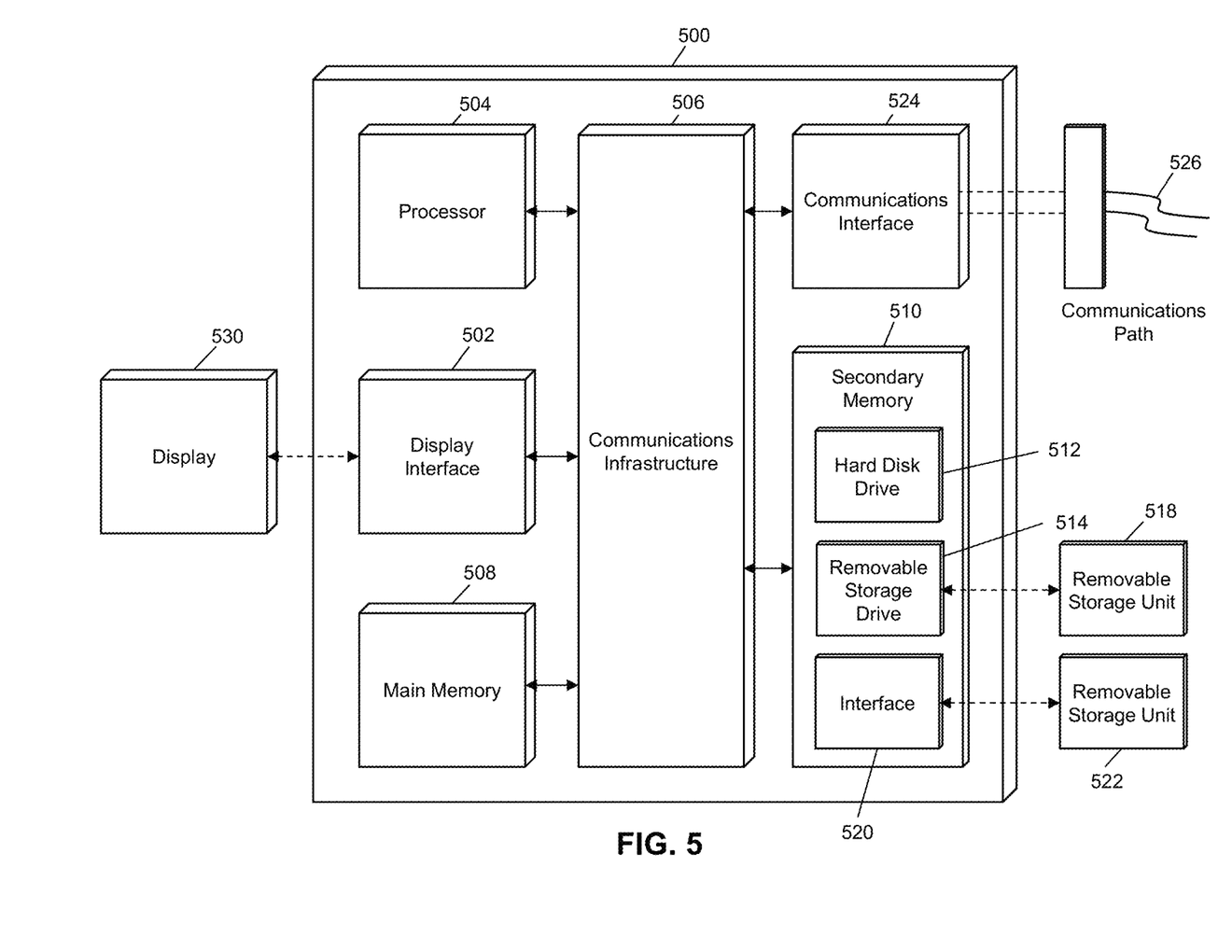
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for validating access to data files using a combination of secure data values. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for validating access to data files using a combination of secure data values, comprising:
   storing, in an account database of a processing server, at least one account profile, wherein the account profile stores data related to a computing device that is authorized to access data files, said data including at least a first check value and a seed value;
   receiving, by a receiver of the processing server, from the computing device, a data request message including at least a first data value, a second data value, a timestamp, and a data file request;
   identifying, by a processing device of the processing server, a second check value using a predetermined algorithm applied to at least (i) the seed value stored in the account profile, related to the computing device, in the account database of the processing server and (ii) the timestamp included in the data request message received from the computing device, wherein identifying the second check value includes receiving output from a smart contract stored in a blockchain that is configured to execute upon input of the timestamp;

validating, by the processing device of the processing server, (i) the first data value, included in the data request message received from the computing device, using the first check value stored in the account profile, related to the computing device, in the account database of the processing server, and (ii) the second data value, included in the data request message received from the computing device, using the identified second check value; and in response to a successful validation of the first data value and the second data value included in the data request message received from the computing device, transmitting, by a transmitter of the processing server, to the computing device, one or more data files indicated in the data file request.

2. The method of claim 1, wherein identifying the second check value further includes submitting, by the processing device of the processing server, the timestamp to the smart contract.

3. The method of claim 1, wherein
the first check value is a private key of a cryptographic key pair,
the first data value is the private key, and
validating the first data value using the first check value includes confirming a match between the first data value and the first check value.

4. The method of claim 1, wherein
the first check value is a public key of a cryptographic key pair,
the first data value is a digital signature generated using a private key of the cryptographic key pair, and
validating the first data value using the first check value includes validating the digital signature using the public key and a suitable signature generation algorithm.

5. The method of claim 1, wherein the one or more data files are stored in the blockchain.

6. The method of claim 5, wherein the processing server is a node in a blockchain network that administers the blockchain.

7. The method of claim 1, wherein
the first data value and the second data value are included in the data request message as a concatenated data string, and
validating the first data value and the second data value includes generating, by the processing device of the processing server, a check data string by concatenating the first check value and the second check value and confirming a match between the concatenated data string and the check data string.

8. A system for validating access to data files using a combination of secure data values, comprising:
an account database, of a processing server, configured to store an account profile, wherein the account profile stores data related to a computing device that is authorized to access data files, said data including at least a first check value and a seed value;
a receiver, of the processing server, configured to receive, from the computing device, a data request message including at least a first data value, a second data value, a timestamp, and a data file request;
a processing device, of the processing server, configured to
identify a second check value using a predetermined algorithm applied to at least (i) the seed value stored in the account profile, related to the computing device, in the account database of the processing server and (ii) the timestamp included in the data request message received from the computing device, wherein the processing device identifies the second check value by receiving output from a smart contract stored in a blockchain that is configured to execute upon input of the timestamp, and
validate (i) the first data value, included in the data request message received from the computing device, using the first check value stored in the account profile, related to the computing device, in the account database of the processing server, and (ii) the second data value, included in the data request message received from the computing device, using the identified second check value; and
a transmitter of the processing server configured to transmit, in response to a successful validation of the first data value and the second data value included in the data request message received from the computing device, one or more data files indicated in the data file request to the computing device.

9. The system of claim 8, wherein the processing device identifies the second check value by submitting the timestamp to the smart contract.

10. The system of claim 8, wherein
the first check value is a private key of a cryptographic key pair,
the first data value is the private key, and
the processing device validates the first data value using the first check value by confirming a match between the first data value and the first check value.

11. The system of claim 8, wherein
the first check value is a public key of a cryptographic key pair,
the first data value is a digital signature generated using a private key of the cryptographic key pair, and
the processing device validates the first data value using the first check value by validating the digital signature using the public key and a suitable signature generation algorithm.

12. The system of claim 8, wherein the one or more data files are stored in the blockchain.

13. The system of claim 12, wherein the processing server is a node in a blockchain network that administers the blockchain.

14. The system of claim 8, wherein
the first data value and the second data value are included in the data request message as a concatenated data string, and
wherein the processing device validates the first data value and the second data value by generating a check data string by concatenating the first check value and the second check value and confirming a match between the concatenated data string and the check data string.

* * * * *